(12) United States Patent
Wickremesinghe et al.

(10) Patent No.: US 10,127,054 B2
(45) Date of Patent: Nov. 13, 2018

(54) BOOTSTRAPPING SERVER USING CONFIGURATION FILE STORED IN SERVER-MANAGED STORAGE

(71) Applicant: ORACLE INTERNATIONAL CORPORATION, Redwood Shores, CA (US)

(72) Inventors: Rajiv Wickremesinghe, Belmont, CA (US); Harish Nandyala, Fremont, CA (US); Prasad Bagal, San Jose, CA (US); David Friedman, New York, NY (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/618,232

(22) Filed: Feb. 10, 2015

(65) Prior Publication Data

US 2015/0160949 A1    Jun. 11, 2015

Related U.S. Application Data

(63) Continuation of application No. 12/610,189, filed on Oct. 30, 2009, now Pat. No. 9,009,121.

(51) Int. Cl.
*G06F 7/00* (2006.01)
*G06F 17/00* (2006.01)
(Continued)

(52) U.S. Cl.
CPC ........ *G06F 9/4416* (2013.01); *G06F 9/44505* (2013.01); *H04L 41/0856* (2013.01);
(Continued)

(58) Field of Classification Search
CPC ............ H04L 41/0873; H04L 41/0856; H04L 41/0859; H04L 67/34; Y10S 707/99954;
(Continued)

(56) References Cited

U.S. PATENT DOCUMENTS 6,286,038 B1   9/2001  Reichmeyer et al.
7,313,819 B2  12/2007  Burnett et al.
(Continued)

OTHER PUBLICATIONS

U.S. Appl. No. 12/610,189, filed Oct. 30, 2009, Office Action, Jul. 6, 2012.
(Continued)

*Primary Examiner* — Azam Cheema
(74) *Attorney, Agent, or Firm* — Hickman Palermo Becker Bingham LLP (57) ABSTRACT

A method and apparatus for booting a clustered management system is provided where the configuration information required to boot the system is stored within the system itself. The techniques cope with several issues including finding the configuration data on the physical disk before the logical disk system is established, coping with replicated copies of configuration data, network partitions and disk drive failures that may prevent a booting node to have perfect knowledge of the state of the entire system, and active nodes modifying or moving configuration data while the booting node is searching for a consistent, correct copy of configuration data.

8 Claims, 10 Drawing Sheets

(51) Int. Cl.
  *G06F 9/4401* (2018.01)
  *H04L 12/24* (2006.01)
  *H04L 29/08* (2006.01)
  *G06F 9/445* (2018.01)

(52) U.S. Cl.
  CPC ...... *H04L 41/0859* (2013.01); *H04L 41/0873* (2013.01); *H04L 67/34* (2013.01); *Y10S 707/99954* (2013.01)

(58) Field of Classification Search
  CPC ...... G06F 9/44505; G06F 9/4416; G06F 9/44; G06F 9/445
  See application file for complete search history.

(56) References Cited

U.S. PATENT DOCUMENTS

| | | | |
|---|---|---|---|
| 7,606,255 B2 | 10/2009 | Smith | |
| 2004/0153694 A1* | 8/2004 | Nicholson | G06F 9/4416 714/6.31 |
| 2005/0257211 A1 | 11/2005 | Chatterjee et al. | |
| 2005/0283575 A1 | 12/2005 | Kobayashi et al. | |
| 2006/0173851 A1* | 8/2006 | Singh | G06F 21/6218 |
| 2008/0059782 A1* | 3/2008 | Kruse | G06F 8/63 713/1 |
| 2008/0209136 A1 | 8/2008 | Qi et al. | |
| 2008/0209413 A1* | 8/2008 | Kakumani | G06F 8/67 717/172 |
| 2009/0070441 A1* | 3/2009 | Karlov | H04L 41/0803 709/220 |
| 2011/0093848 A1 | 4/2011 | Filali-Adib et al. | |

OTHER PUBLICATIONS

U.S. Appl. No. 12/610,189, filed Oct. 30, 2009, Final Office Action, Jan. 14, 2013.
U.S. Appl. No. 12/610,189, filed Oct. 30, 2009, Advisory Action, Jul. 8, 2014.
U.S. Appl. No. 12/610,189, filed Oct. 30, 2009, Office Action, Sep. 28, 211.
U.S. Appl. No. 12/610,189, filed Oct. 30, 2009, Notice of Allowance, Dec. 19, 2014.
U.S. Appl. No. 12/610,189, filed Oct. 30, 2009, Interview Summary, Jun. 13, 2014.
U.S. Appl. No. 12/610,189, filed Oct. 30, 2009, Final Office Action, Mar. 25, 2014.

* cited by examiner

BOOTSTRAPPING SERVER USING CONFIGURATION FILE STORED IN SERVER-MANAGED STORAGE

CROSS-REFERENCE TO RELATED APPLICATIONS; BENEFIT CLAIM

This application claims the benefit under 35 U.S.C. § 120 as a continuation of application Ser. No. 12/610,189, filed Oct. 30, 2009, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE INVENTION

The present invention relates to the operation of a multi-node storage management system and in particular, managing configuration information within the clustered storage management system itself.

BACKGROUND

A storage management system (SMS) provides a data storage and retrieval service. An SMS may provide a file system. An SMS may also provide fault tolerance that guarantees the consistency of the data that the SMS manages. Fault tolerance may rely on creating multiple copies of the same data to avoid data loss in the event of a device or network failure.

Data storage systems include one or more storage devices connected to a controller or manager. As used herein, the term "data storage device" refers to any device or apparatus that can be used for the storage of data, e.g., a disk drive. For explanatory purposes only and not with intent to limit the scope of the invention, the terms "disk drive," "disk," "storage device," and "device" are used throughout this document interchangeably with the term "data storage device."

A clustered system is a multi-node system made up of interconnected nodes that share and manage access to the same resources. Nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternatively, the nodes may be the nodes of a grid. A grid is composed of nodes in the form of server blades interconnected with other server blades on a rack.

A clustered storage management system provides a storage system interface to clients inside or outside of the cluster. For example, each node in a clustered database system hosts an instance of a storage management server that works together with storage management servers running on other node instances to provide a storage management service. Working together requires the ability to communicate. Thus, a fault tolerant SMS must overcome network failures that prevent nodes from working together.

To protect against the loss of information, data in the storage system can be "mirrored" (i.e., duplicated and stored) in two or more separate storage locations. In this way, an additional copy of data is available for retrieval if the first copy cannot be accessed. However, systems may provide mirroring at relatively coarse granularity levels. For example, many systems provide mirroring at the granularity of the disk drive, i.e., entire disk drives are mirrored, even if only a portion of the data on the disk drive needs to be mirrored. By implementing mirroring on a disk drive basis, it is not normally possible to mix data with different redundancy requirements on the same disk drive.

The functions of configuring, addressing, and administering storage devices are performed manually by an administrator who must make choices as to the proper configuration to employ. When a large number of disk drives are used, this manual administration becomes more and more difficult and is prone to human error and their structures (administrative and data) do not scale well beyond a certain number of disk drives.

One of the many issues presented by the complexity of a clustered storage management system is bootstrapping the system. The configuration of such a storage system must be retrieved from persistent storage. The manual administration of managing storage system configuration data required for booting the system may be a burden for the reasons explained above.

Described herein is an approach that provides a fault tolerant storage management system that can reliably manage its own configuration data rather than relying on external administration.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Bootstrapping a complex distributed system with multiple nodes that are interdependent on one another requires careful design. This is especially true when information needed to boot is managed by the element attempting to boot. In storage management systems, such as a multi-node clustered storage management system, the configuration data required to boot the system may be changed frequently in response to the changing state of the system. The behavior of the system may depend on the current state of the system that is reflected in the configuration data parameters. For example, when memory becomes constrained, different policies may be utilized. Thus, whenever there is a state change that affects the behavior of the system, the configuration data may have to be updated. Maintaining such dynamic data can be difficult in such an environment.

Figure 1:
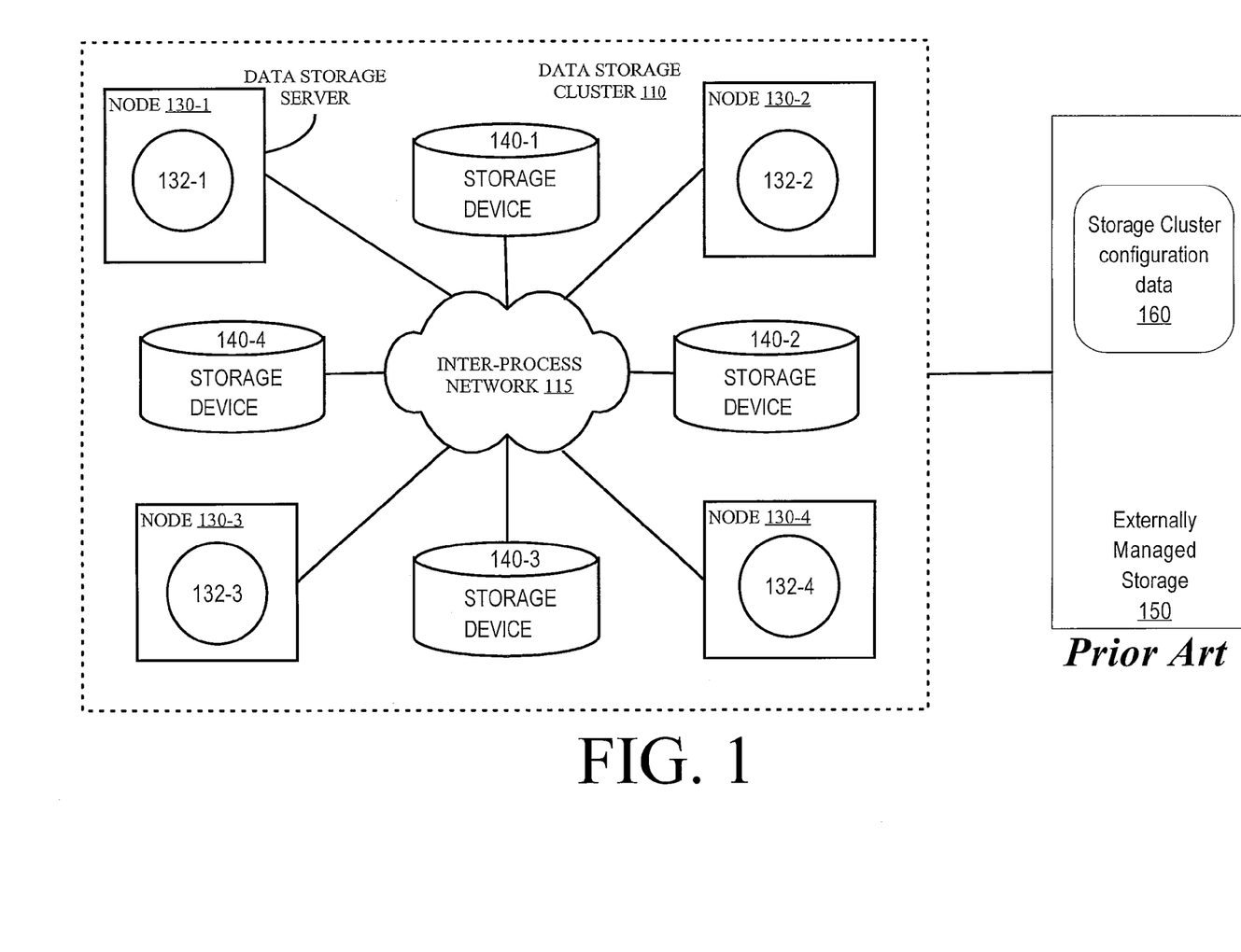
FIG. 1 is a diagram of a clustered storage management system with the configuration data for the storage system stored external to the storage system, according to an embodiment of the present invention.

Bootstrapping may rely on configuration data stored outside of the storage devices that are managed by the storage management system. FIG. 1 depicts an example of such an environment. Data storage cluster 110 represents the storage management system (SMS) comprising nodes and storage devices, where the nodes provide a storage service to clients and use the storage devices to store and retrieve data. The configuration data needed to boot the SMS service resides in managed storage outside of the SMS itself. Separate and external management of the configuration data is required. In FIG. 1, Externally-Managed Storage 150 manages and provides the Storage Cluster Configuration Data 160 to the storage management system at SMS boot time and ensures that the correct version is available. Thus, many of the storage management functions provided by the cluster must be replicated outside of the SMS cluster.

One way to allow a cluster of nodes providing a storage service to boot using information stored on the same devices that are managed by the storage system is to create a private copy of the configuration data for each node in the cluster. When a node boots, the node may consult its private copy of configuration data that is stored in a location known to the booting node. However, maintaining a private copy per cluster node may be expensive, requiring much effort to keep the content of the replicas synchronized when updates are needed. Human intervention might even be required to assure that all nodes have the correct version of the configuration data when an update occurs.

It is advantageous to manage configuration data like other data in the storage system that is managed on behalf of a client. A booted node instance may reference configuration data using a logical address, the configuration data may be replicated, and the data may be physically relocated over time. The approach and techniques described herein are directed towards a way of storing configuration data needed for booting a node instance of a storage management cluster so that the booting node can find a correct version of the configuration data in the face of network and storage device failures, as well as concurrent writing or relocation of configuration data by already running node instances. In one embodiment, configuration data may be stored as a file in a file system.

When a node instance of the SMS first boots, the storage devices that are to be managed by the node instance of the SMS can be accessed by their physical addresses, but logical-to-physical address mappings have not yet been established. Creating the logical-to-physical maps requires information in the SMS configuration data. Thus, a significant challenge is to find the configuration data on the physical disk. The configuration data might have been relocated since the node was last running, or another running node instance might be in the process of relocating the configuration data at the time the booting node is searching for the configuration data.

When the cluster is first brought up, a cluster-wide locking service is one of the first services started. This service is relied upon to lock resources such as configuration data during the booting process. The approach also relies on particular minimal but important information being stored at fixed locations on the physical disk to enable a booting node to find configuration data. "Fixed locations" means that for a certain revision of software, the information is always found at the same physical disk address across boots of the nodes. In one embodiment, the information itself is stored at the same address across all storage devices. In other words, the information is not relocated during normal operation of the system (i.e. only cluster maintenance activities such as software upgrades may cause the information to be moved). Thus, a "non-fixed location" means that data may be moved from one physical address to another during the normal operation of the SMS. Data managed on behalf of SMS clients are stored at non-fixed locations because the data are subject to relocation among the disks managed by the SMS.

In one embodiment, the SMS provides storage services for a database management system. In such an embodiment, the SMS is optimized for database file storage and retrieval. When the database is first booted, the database may initiate the booting of the SMS. The configuration of the database parameters needed to boot the database may be stored in the database system which may be managed as files in the SMS.

In addition to the basic approach for booting the SMS, there are several opportunistic performance enhancements described.

Operating Environment

A multi-node clustered management server manages potentially many storage devices and provides a fault-tolerant storage service. Replication of data across storage devices is one technique used to achieve fault tolerance. Thus, what appears to a client of the SMS as a single file or block of data might be managed internal to the SMS as several files or blocks across several storage devices.

In the present application, the configuration information needed to bootstrap operations of each node instance of the SMS is internal to the SMS on the same storage devices being managed by the SMS. Furthermore, once booted, the configuration data appears as any other data managed within the SMS. In other words, the management of the configuration data may be performed through the same storage interfaces as storage service clients use for their data. Thus, only at boot time may managing configuration data be performed differently than the way that other data is normally handled.

Replicas of the configuration may appear on several storage devices (to avoid a single point of failure), and network or device failures could cause the copies of configuration data on different disks to become out of sync. It is important for proper functioning to locate and identify a correct and consistent version of the configuration data.

A cluster-wide locking service is available at the time the SMS boots and provides for mutual exclusion of critical resources. Examples of critical resources that need mutually exclusive access during booting include the content and location of the configuration data and the content of the disk mode, which indicates the online or offline status of each disk.

Figure 2:
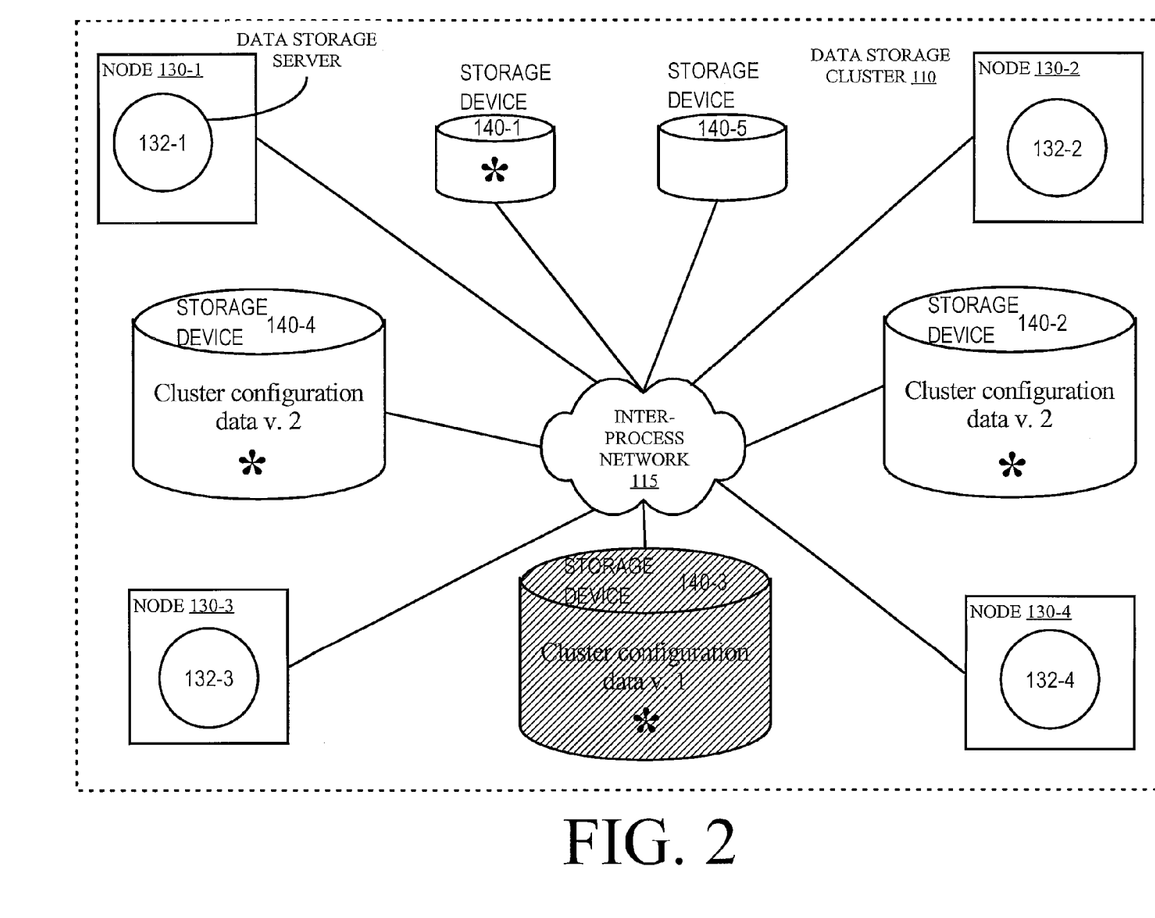
FIG. 2 is a diagram of a clustered storage management system storing its own configuration data, according to an embodiment of the present invention.

FIG. 2 shows a block diagram of an example environment in one embodiment. Node instances 130-1, 130-2, 130-3, and 130-4 are communicatively coupled through the interprocess network 115 to each other and to storage devices 140-1, 140-2, 140-3, and 140-4, 140-5, and 140-6. In the example depicted in FIG. 2, an asterisk symbol ("*") on the disk indicates that the disk is managed by the SMS. Even though storage device 140-5 is accessible by the nodes in the cluster, device 140-5 is not configured to be in the group of storage devices managed by the SMS on behalf of any client of the SMS.

A subset of the managed storage devices may contain a copy of the cluster configuration data. Storage devices 140-2 and 140-3 each have a copy of version 2 of the configuration data and storage device 140-3 has version 1 of the configuration data. Storage device 140-3 is shown as shaded to indicate that the disk is offline. An example scenario that might explain this state is as follows. At one point in time, all storage devices 140-2, 140-3, and 140-4 were online and stored version 1 of the configuration data. The configuration data was updated to version 2, and was successfully written to devices 140-2 and 140-4, but failed to write to device 140-3. As a result of the write failure, the device was taken offline. Thus, the previous version still resides on device 140-3. Even though the disk contains a copy of the configuration data, the copy is not to be used while the disk is offline. Thus, when a node instance boots in this example environment, the SMS will need to find version 2 of the configuration data located on one of storage devices 140-4 and 140-2.

A file directory is a file stored in the storage management system that maintains the logical-to-physical address translations of each file managed in the system. The file directory file comprises an array of file descriptors, each of which is identified by a file number. The file number comprises part of the logical address of the file that the file descriptor entry represents. Most files are dynamically allocated a file number at the time of file creation. In general, a directory entry includes metadata about the file represented by the directory entry, including a list of disk fragments that together comprise the file. A disk fragment is a disk block of a particular size. In one embodiment, all disk fragments on the same disk are the same size while the system is in operation for its intended purpose. In another embodiment, the disk fragment size is the same across all storage devices in the system while the system is in operation for its intended purpose. However, the fragment size may change across updates to the system. A disk fragment is identified by the disk identifier and the physical starting address of the fragment. An example directory entry for a file that requires three disk blocks of the same size and that has two replicas would have six fragment descriptors in its directory entry. When a file is relocated, the directory entry must be updated to reflect the new fragment list where the file resides. A lock provides exclusive access to updating a directory entry.

Figure 3:
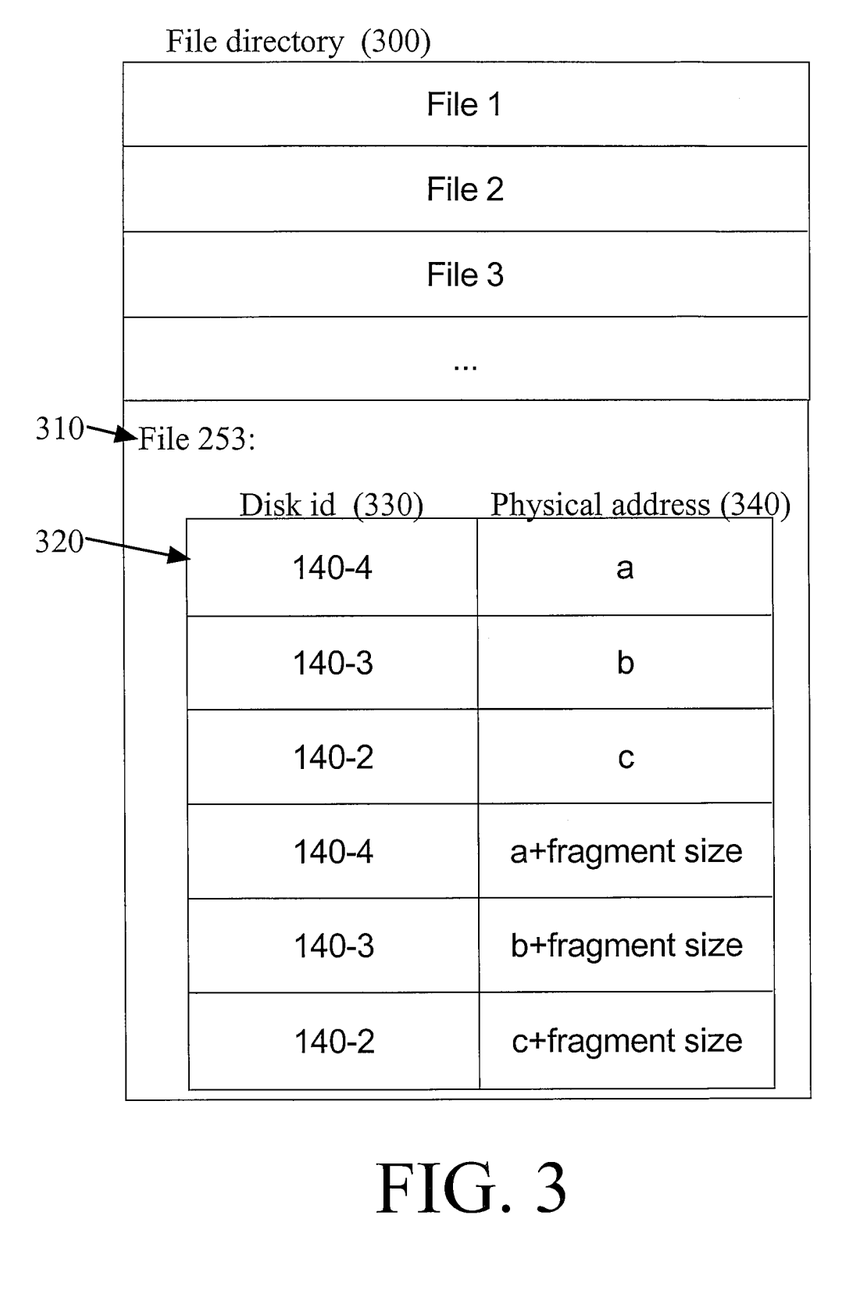
FIG. 3 is a block diagram showing an example layout of a file descriptor for the configuration file, according to an embodiment of the present invention.

As mentioned earlier, the configuration data may be stored as a file and managed as described above for other files, but there are several ways in which the configuration file is handled specially to enable the system to boot easier. A key to being able to find the configuration file at boot time is the ability to identify and reference the physical address of the configuration data on the disk directly. Thus the configuration file is sometimes referenced by logical address (after booting) and sometimes by physical address (while booting). The configuration file is pre-allocated a constant file number 253, and its address translation is always stored in the directory entry corresponding to file number 253. Thus, the logical address never changes. Also, the disk fragments for the configuration file are allocated contiguously on the disk. Thus, each copy of the configuration file is stored completely on a single disk and may be located completely by a physical start and end address. There is no need to assemble scattered disk fragments to read the configuration file. FIG. 3 is a block diagram showing an example layout of a file directory 300 that contains a file descriptor entry 310 for the configuration file. The disk identifiers 330 were chosen to match those in FIG. 2; however, other naming conventions may be used to identify storage devices. The fragment table 320 contains fragment entries for files stored on devices 140-4, 140-3, and 140-2. There are two fragments on each of these storage devices, indicating that the size of the configuration file requires two disk fragments to contain the data. The physical address 340 column is the start address for each fragment. The end address of each fragment is the size of a fragment added to the start address because each fragment takes the same amount of space on the disk. The second fragment of each file starts immediately following the first fragment because the fragments of the configuration file are contiguous. In one embodiment, there is an ordering of the disks. Each fragment and its corresponding copies (mirrors) appear next to each other in the sequential order of the disks on which each resides. For example, in FIG. 3, the disks are ordered as 140-4, 140-3, and 140-2 with the addresses for fragment 1 appearing across all disks first, followed by the addresses for fragment 2 for each disk. However, it should be appreciated that there are alternative embodiments as well. For example, the fragments in the table may appear with all of the fragments for a particular disk in the order that the fragment appears within the configuration file on that disk. In yet another embodiment, each fragment entry may also contain the number of the fragment within the file. Such an embodiment allows the configuration files to be assembled independent of the order in which their fragments are placed in the fragment table.

Booting Process

Figure 4:
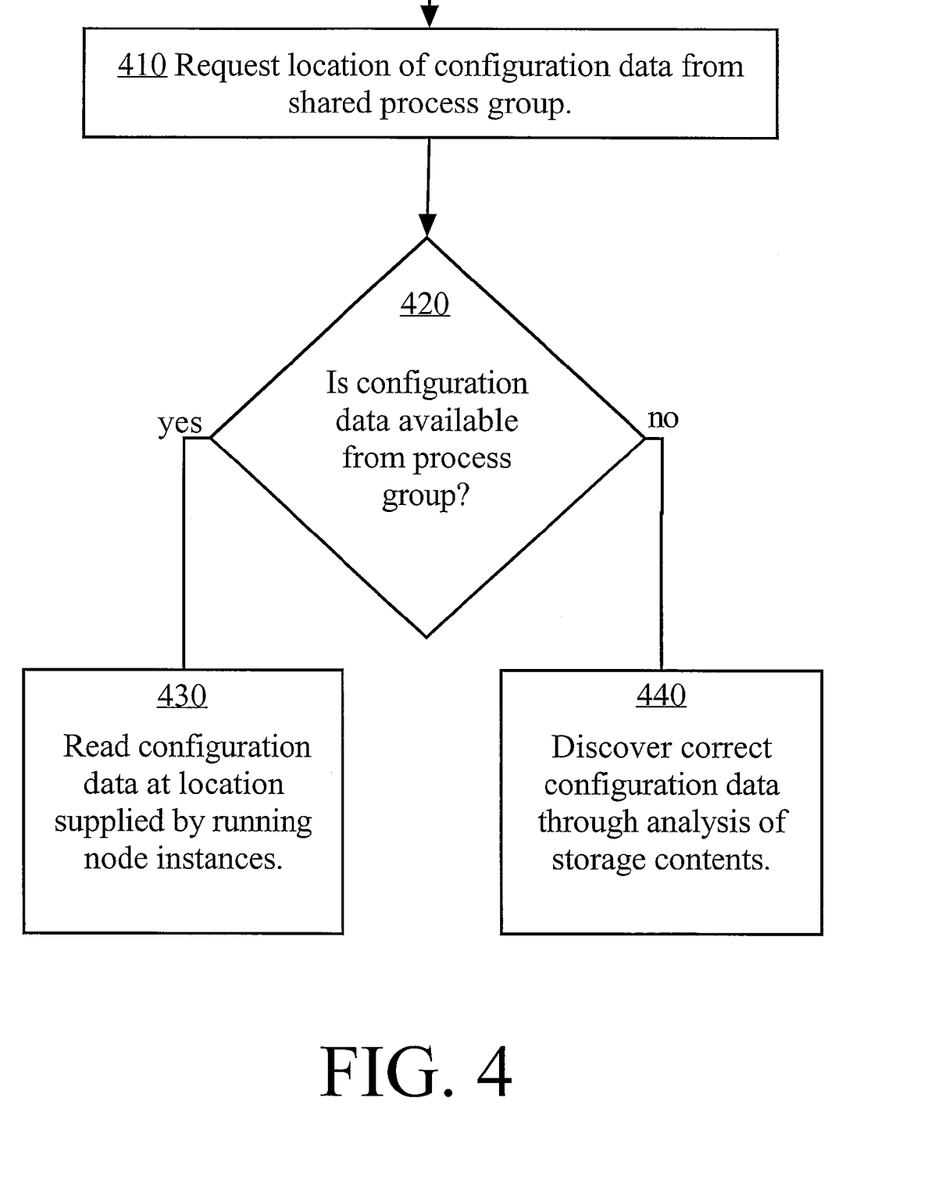
FIG. 4 is a flow diagram of the top level steps for discovering the location of the correct, consistent configuration data within the storage system, according to an embodiment of the present invention.

FIG. 4 shows an overview of the booting process. The depicted flow is from the perspective of a booting node instance that does not have knowledge of the cluster environment yet. That is, the booting node does not know if there are already-running nodes that are already managing data on the disks. A booting node instance is also unaware of what network and/or device failures may have occurred. All of the storage management server instances form a process group that share data that is private to the group.

In one embodiment, if the booting node instance is not the first node to boot in the SMS, then another management server instance in the SMS process group already managing the storage may have knowledge of where a current and consistent copy of the configuration data resides. In Step 410, the booting node attempts to find the location of the current configuration data maintained by at least one running member of the process group.

In one embodiment, the location information obtained from a running node comprises a disk path, a physical start address of the configuration data on that disk, and the mode of the disk on which configuration data resides. The location information may be stored in and read from the process group shared memory. In Step 420, the booting node determines whether a response was received with the requested information, and if so, the information is used in Step 430 to find and retrieve the configuration data.

The booting instance might not receive a response to the request for configuration information. For example, there might be no other currently running node instances. The only way for a booting node to know that there are other running nodes is to discover running instances by broadcasting a request and receiving a response. Thus, if the booting instance is the first instance to boot, there are no other nodes to respond.

Using information from already running nodes is a convenient performance enhancement that avoids having to analyze the disks. However, the booting process can proceed without consulting information from running nodes. If other running nodes do not exist and are not reachable, then in Step 440, the configuration data must be discovered by directly inspecting the physical disks.

Figure 5A:
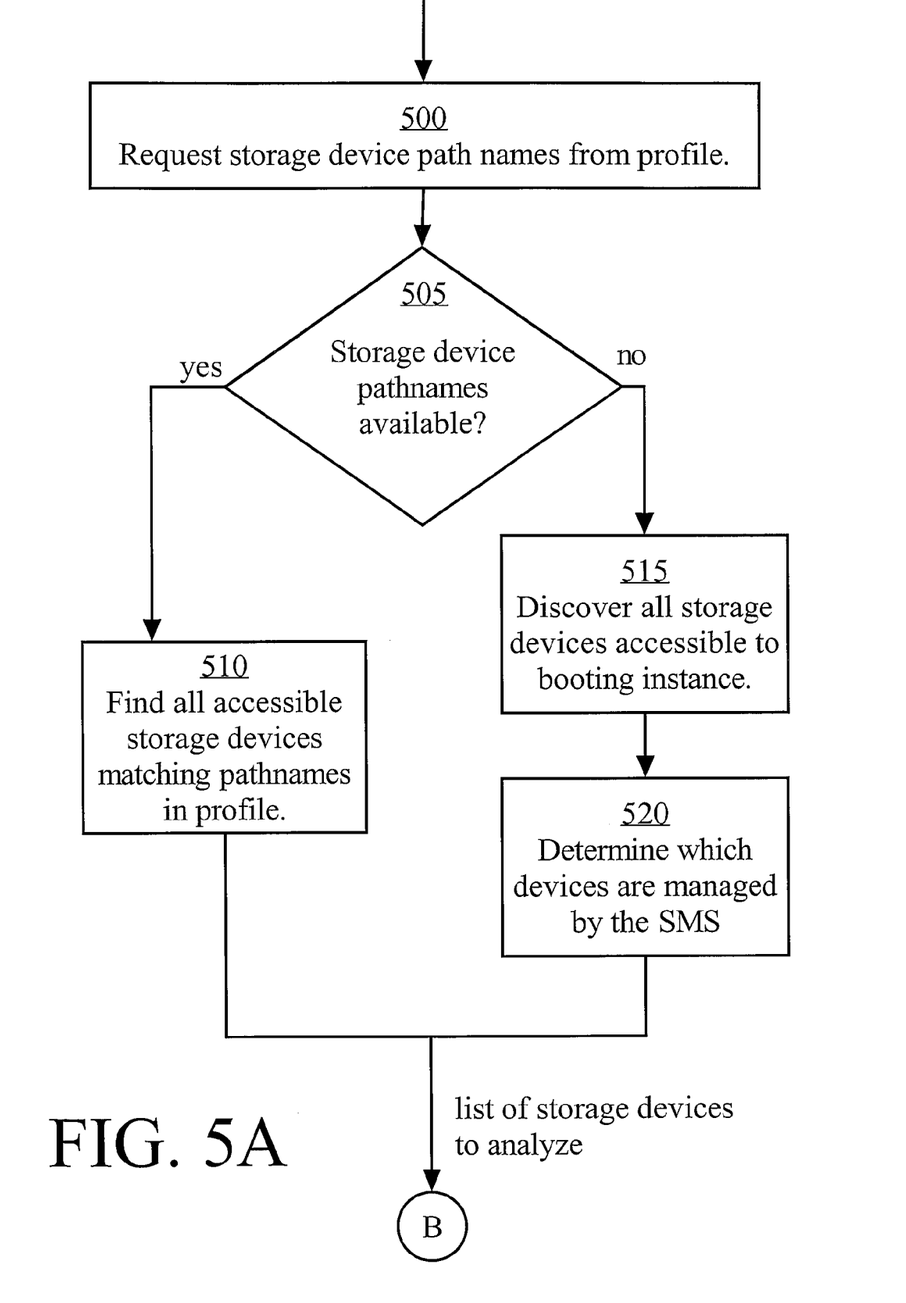
FIG. 5A is a flow diagram showing the process for discovering the set of storage devices that may contain configuration data, according to an embodiment of the present invention.

Discovering configuration data on the disks comprises several high level steps: determining which disks are managed by the SMS, determining which disks contain configuration data, and discovering which disks have data that can be relied upon to assure obtaining a consistent and current version. FIG. 5A shows the steps for discovering the set of disks on which to search for configuration data. In Step 500, the booting node requests the set of disk path names from a cluster service that is up and running at the time the SMS first boots. In one embodiment, the disk path names are represented as a sequence of bytes, such as textual characters (e.g. a string) containing one or more regular expressions to identify a device path to the underlying operating system. For example, using the syntax for the Unix operating system, the following disk path names could be used:

```
/dev/raw/raw 1, /dev/raw/raw2,/dev/raw/raw3
/dev/raw/raw[123]
/dev/raw/raw*
/dev/raw/raw?
```

The first example explicitly lists the paths of each of the disks managed by the storage service. The other examples are each regular expressions where each disk string represents a collection of disks whose paths match the specified patterns. Thus, the second example and the first evaluate to the same set of disks. The disk string information rarely changes; that is, storage devices do not change path names frequently and the configuration of storage devices is relatively static. Thus, there is not much danger in relying on the disk strings as a starting place for discovering the location of the configuration data if the disk string is available.

In Step 505, a test is made to determine whether a disk string was obtained in Step 500. If so, then only the storage devices whose paths match the disk string need to be analyzed for finding configuration data (Step 510). The set of disks managed by the SMS may be a subset of all disks that are accessible to the booting node instance. Using the disk string is a performance optimization to avoid having to inspect those disks that are not managed by the SMS. The booting process can still be successful without optional Steps 500, 505, and 510. If no disk string is available, then all accessible storage devices need to be analyzed. In Step 515, the booting instance requests that the operating system provide a list of all disks that are accessible to the booting node instance. In Step 520, a fixed location on each disk is read, looking for a signature that identifies the disk as belonging to the set of disks that are managed by the SMS. Once the list of storage devices managed by the SMS has been identified, this list is analyzed to find a valid copy of the configuration data.

Figure 5B:
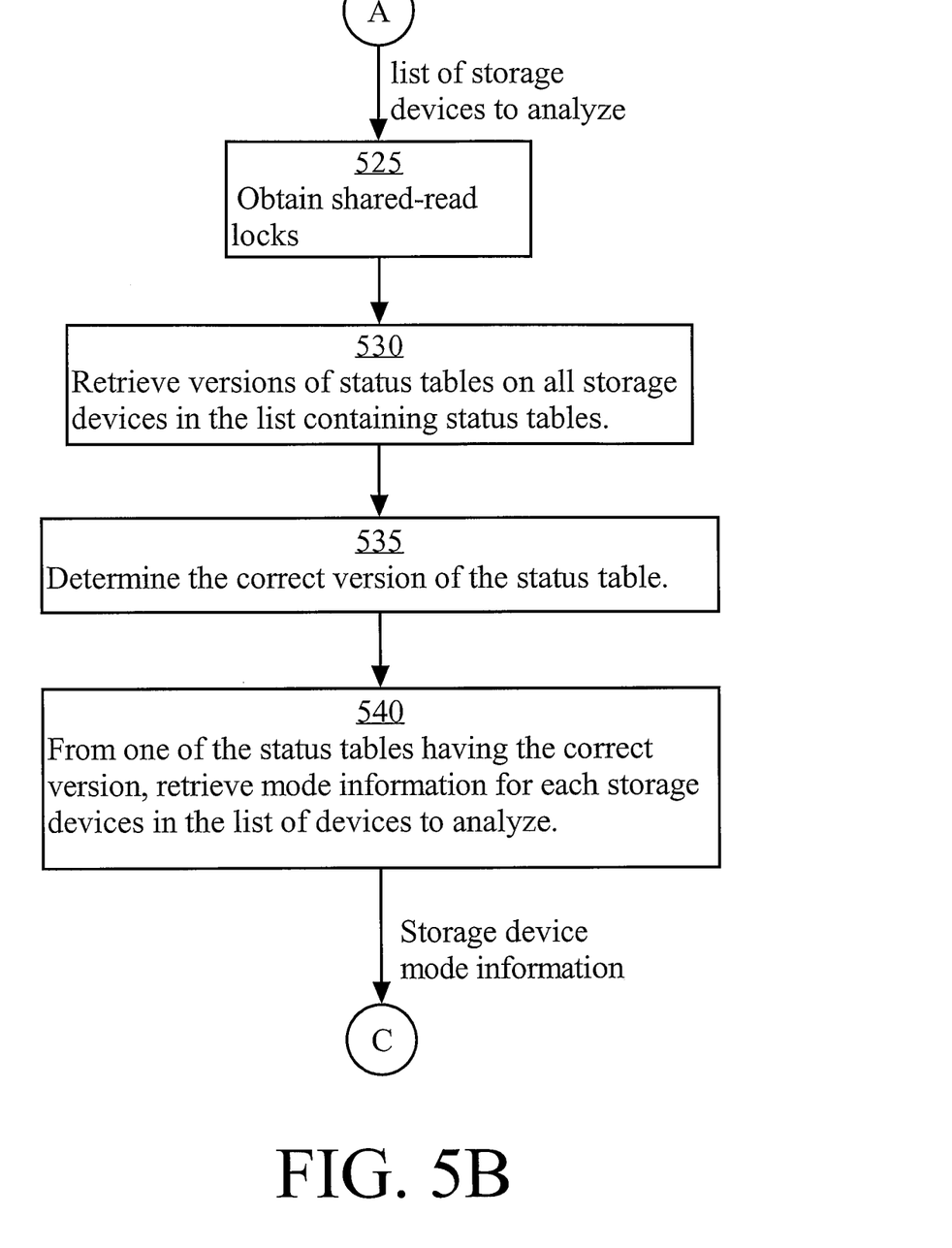
FIG. 5B is a flow diagram showing the determination of the correct status table information, according to an embodiment of the invention.

FIG. 5B shows the flow for finding the mode information for each storage device on the list to be analyzed. The mode is an indication of whether the disk is online or offline. The mode information is stored in a status table that is mirrored across some set of storage devices. The set of disks storing the status table may be independent of the set of disks storing the configuration file. All disks in the list of storage devices managed by the SMS are examined for finding the correct version of the status table.

In Step 525, a cluster-wide shared-read lock is obtained on the status table to prevent running node instances from changing the disk mode while the analysis is taking place. In Step 530, all the storage devices in the list are examined to identify which storage devices contain a status table. In one embodiment, the status table is located at a fixed address on every storage device. Each status table that is found is read to determine the version of the status table. In Step 535, the correct version of the status table is determined as a function of the number of status tables with each version number. In one embodiment, a version number associated with the majority of status tables is selected as the correct version. The majority version number may not necessarily be the latest version number. In Step 540, a mirror of the status table having the correct version is retrieved containing mode information for each disk in the SMS group.

Figure 5C:
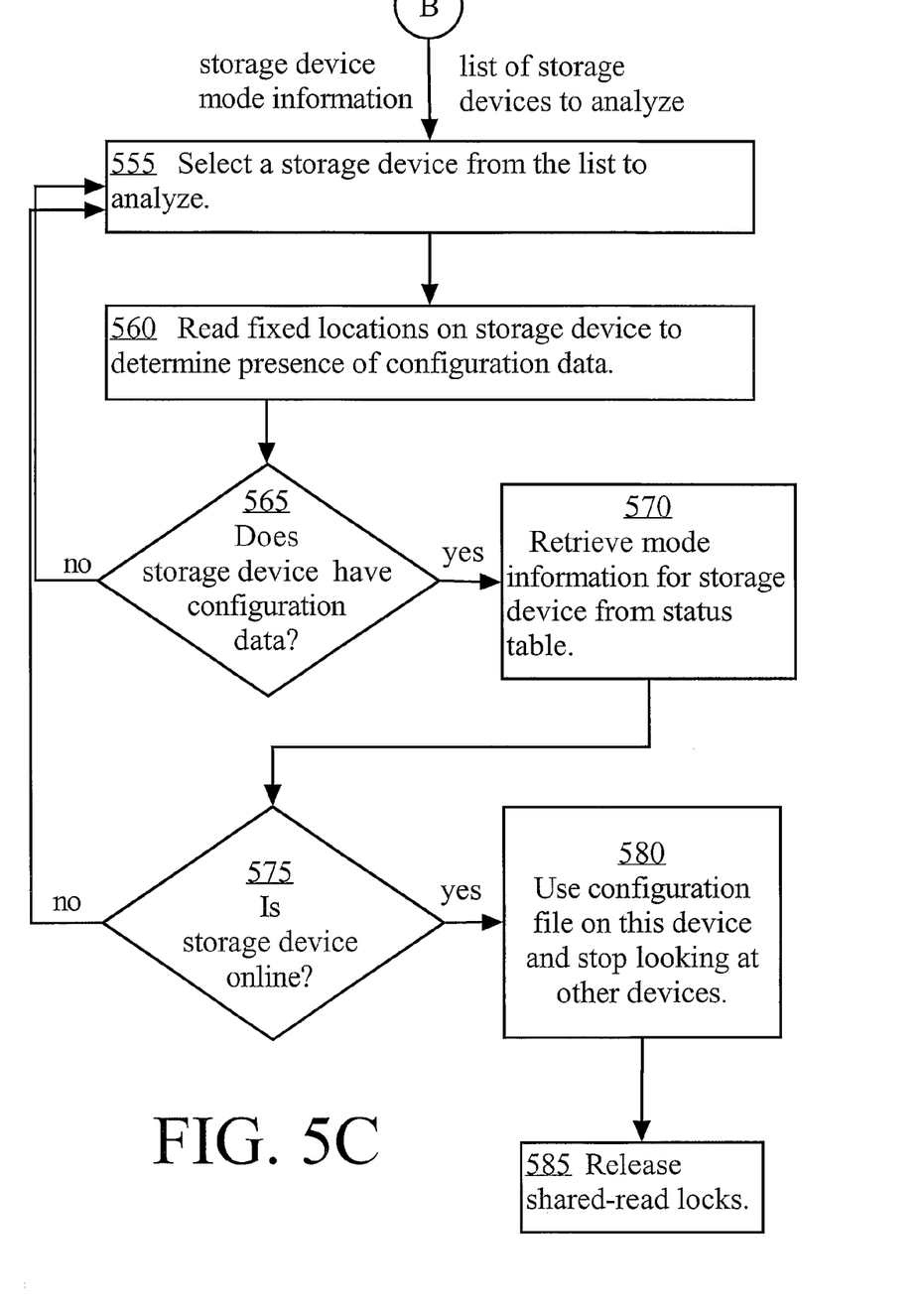
FIG. 5C is a flow diagram showing analyzing the contents of the physical storage devices to find the correct, consistent configuration data, according to an embodiment of the present invention.

FIG. 5C continues the flow of finding a correct version of configuration data. The flow in FIG. 5C is performed on each disk until a disk is identified that has a valid copy of the configuration data. In Step 555, a disk is selected from the list of storage devices to analyze. In Step 560, the physical start and end addresses of the configuration data are read from a fixed location on the disk. The values for the start and end addresses are validated to determine whether a copy of the configuration data resides on this disk (validating addresses is described below). In Step 565, a determination is made regarding whether the disk contains a configuration file. Those disks that do not have configuration data are removed from consideration and the flow is repeated for another disk (Step 555).

For those disks that do contain configuration data, Step 570 is performed to determine whether the configuration data is valid. The configuration data is considered valid if the disk mode is online. The disk is looked up in the status table to determine whether the disk is online or offline. If the disk is offline in Step 575, the disk is removed from consideration and the flow is repeated for another disk (Step 555). If the disk is online, the flow proceeds to Step 580 which selects the configuration file on the currently analyzed disk. The configuration data is read into memory from the physical disk between the start and end physical addresses. Once the correct configuration data is obtained, the cluster-wide locks are released in Step 585.

A person of reasonable skill in the art will appreciate that determining whether a device is online and whether the device contains configuration data may be performed in either order or concurrently, although the order may impact the locking protocol.

Disk Layout and Analysis

Figure 6:
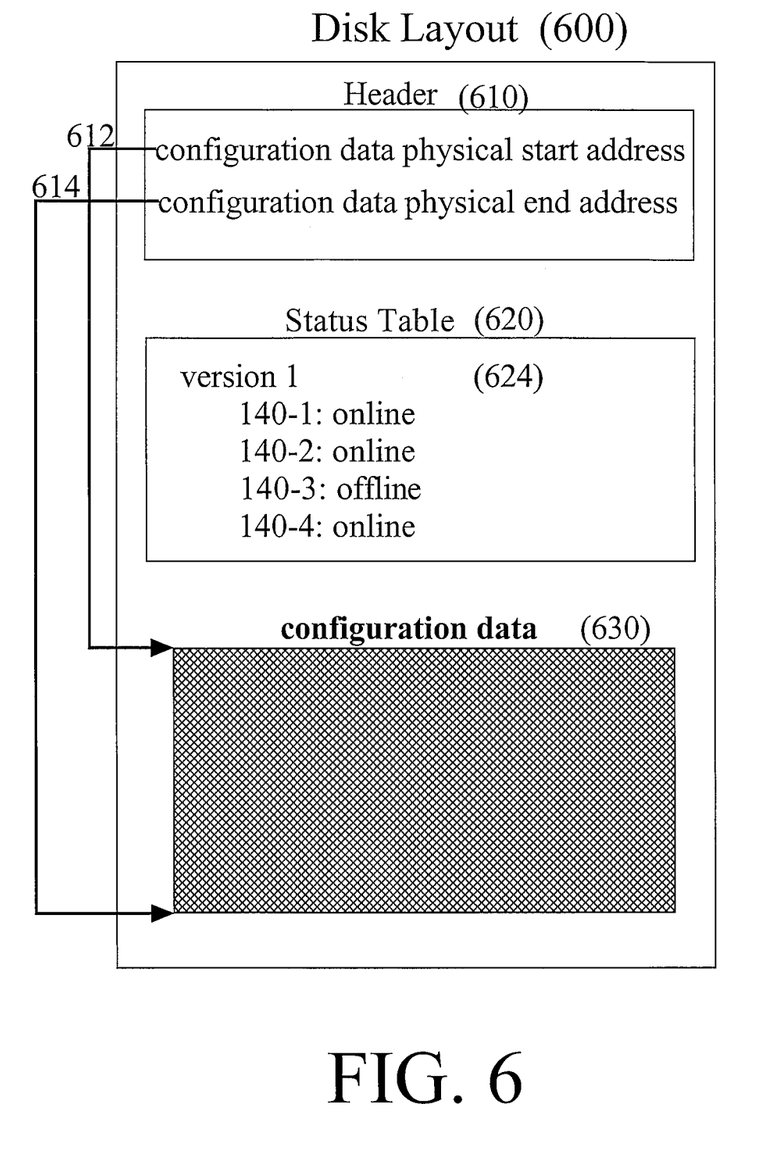
FIG. 6 is a diagram of the disk layout that a node instance relies on for finding the configuration data, according to an embodiment of the present invention.

FIG. 6 is a diagram of some of the important information that is stored on a storage device that facilitates the booting process. FIG. 6 shows Disk Layout 600 that includes two areas each of which reside at a fixed, well-known physical address: Header 610 and Status Table 620. If a disk contains a configuration file, the Header 610 includes the physical start address 612 and physical end address 614 of the configuration data that is stored on this disk. The booting instance examines these physical addresses to determine whether configuration data is stored on this storage device. If the addresses are invalid, then the booting instance concludes that there is no configuration on this disk and moves on to analyzing a different disk. In one embodiment, the physical start and end addresses may be null to indicate that no configuration data is stored on the device. In another embodiment, the physical start address may be greater than the physical end address (in other words, may point to a location beyond the physical end address) to indicate that any configuration data that might be stored on that device is not current or available for use.

Status Table 620 (Mode 624) contains data for each storage device that indicates whether the disk is online or offline. As explained above, the booting instance discovers which disks in the group contain a status table, and all such status tables are used to determine the correct mode for each disk in the group. Although it might be possible to read from an offline disk, data residing on an offline device is not relied on for current data. The booting process must rely on configuration data from an online device for correct operation.

Once the booting instance has determined that the device is both online and contains configuration data, configuration data 630 is read into memory from the device starting at the physical start address 612 and stopping at the physical end address 614. In one embodiment, the configuration data is read into memory that is private to the node. Alternatively, the configuration data may be read into a shared volatile memory. From memory, the parameter values defined in the configuration data may be used to complete the booting process of the storage manager.

Preventing Inconsistent Configuration Data

Even when no running node instances are found in the process group, obtaining the mutual exclusion locks is still important for several reasons. One reason is that another node instance may start to boot before the first node instance completes booting. Another reason is that two instances may start to boot at the same time.

When more than one node instance is up and running (i.e. has completed the boot sequence) in the storage management cluster, mutual exclusion locks serialize access to critical resources to protect shared data from becoming inconsistent due to race conditions. Serialized access is needed among running instances as well as between running instances and booting instances.

Booting nodes do not update configuration data. Thus, a booting node will only obtain a shared read lock on the configuration data, and holding such a lock will prevent running node instances from updating the configuration data until the lock is released. Likewise, when a running node needs to update configuration data, the running node obtains an exclusive write lock on the configuration file. Any other node, booting or currently running, will fail to obtain a shared read lock while the configuration data is being updated, and thus be prevented from reading the data while the date is being updated. Therefore, if a booting node is successful in obtaining the read lock, the configuration data may be read without interference from running nodes. Similarly, there is a mode lock that protects the Status Table on the disk. Before reading a mode value from the Status Table, a node must obtain the mode shared read lock. Before updating the mode value on a disk, a running node must obtain the mode exclusive write lock. A disk can only be changed from online to offline or vice versa by the holder of the mode exclusive write lock.

In one embodiment, the running nodes write replicas of the same file to multiple storage devices concurrently. If one of the target devices returns an error in response to attempting to store a replica on the device, then that device may be taken offline. However, if a booting instance holds a shared read mode lock on that device, the device cannot be taken offline until the booting disk releases the lock.

Controlling updates to the configuration data itself in the same location on disk is relatively straightforward because the configuration data itself can be locked by the cluster-wide lock that is available to the booting instance. Controlling relocation, that is, updates to the location of the configuration data, is more problematic. The location of the configuration data resides in several places that must be kept synchronized. As mentioned earlier, the physical start and end addresses reside in the disk header of each disk that holds a copy. In addition, a file directory contains the logical-to-physical mapping and mode for each disk that holds a copy. If the configuration data is moved, the mapping must be changed. Also, a copy of the physical addresses and mode is stored in the process group shared memory. A lock that is only accessible to running nodes protects the address mapping of the configuration data in the file directory. In one embodiment, the file directory is itself a file that may be replicated and relocated. Thus, the file directory is only readable by running nodes that have a copy of the file directory.

Figure 7:
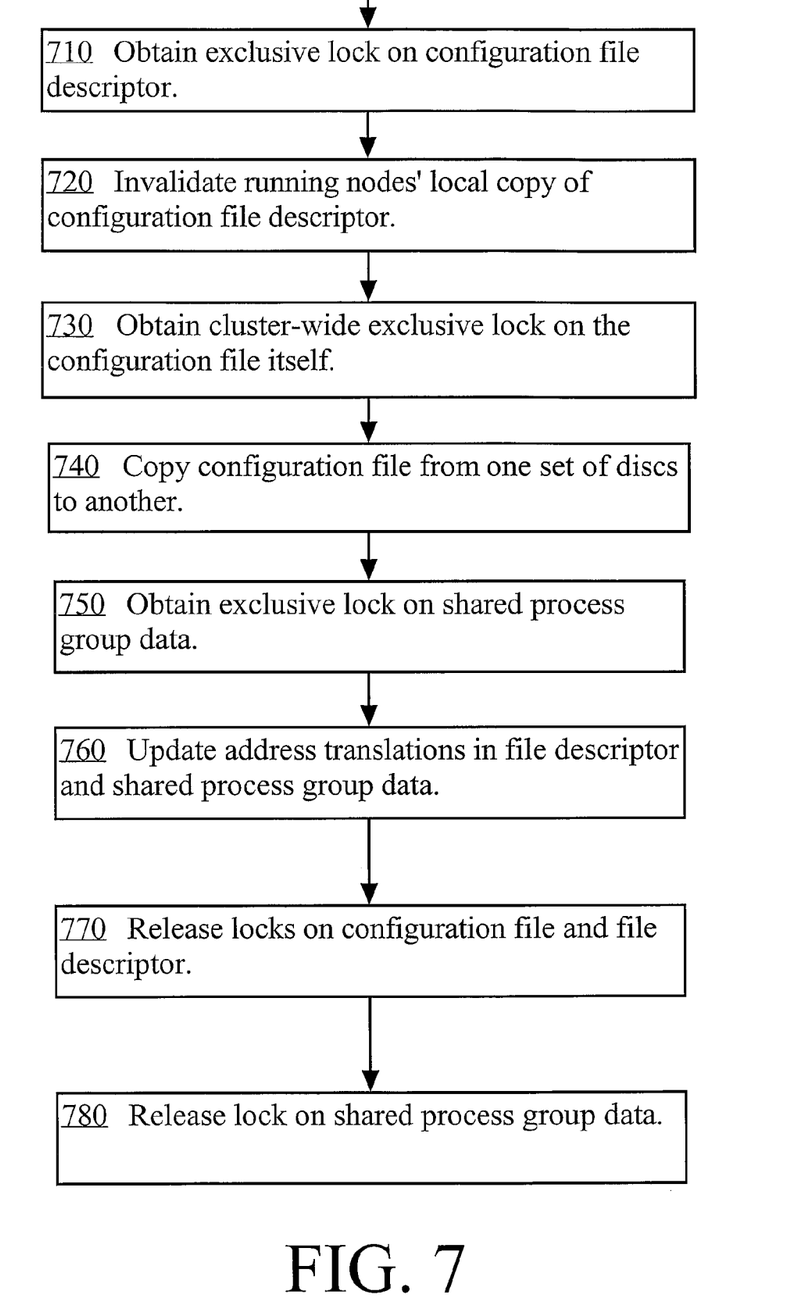
FIG. 7 is a flow diagram showing the process for relocating a configuration file, according to an embodiment of the present invention.

FIG. 7 shows the steps for relocating configuration data. A running instance wanting to relocate the configuration data first obtains a lock on the file directory entry for the configuration data (Step 710). This prevents other running instances from also changing the logical-to-physical address mapping. The local copies cached in each instance of the file directory are invalidated so that before a local copy of the file directory can be used again, the local copy will need to be refreshed after the lock on the file directory is released (Step 720). Until then, no running node will be able to access the configuration file. However, at this point, booting instances can access the configuration file because booting instances access the configuration data based on physical data and do not rely on the address translation to access the data.

Next, the running node that is about to relocate the data obtains the cluster-wide, exclusive lock on the configuration file (Step 730). If successful, subsequent attempts of a booting instance to read the configuration file will fail until this lock is released. At this point, no node may perform any I/O on the configuration data, and the configuration data may be safely copied from one set of disks to another set of disks (Step 740). Once the copies are successfully relocated, an exclusive lock on the shared process group data is obtained for the purpose of updating the location of the configuration file (Step 750). This lock is the same lock as the mode lock. Both the address translations in the file descriptor and the new location of the configuration file stored in the shared process group data are updated in Step 760. Thus, when the cluster-wide configuration data lock and the file directory entry lock are released in Step 770, running instances are again able to access the relocated configuration data because running instances do not rely on the process group data to know the logical-to-physical translation of the configuration data. However, booting nodes are still not be able to read configuration data because reading the data requires both the cluster-wide configuration data lock and the mode lock, and the mode lock is not yet available. Only after the process group data is updated is the exclusive lock released in Step 780. Once the exclusive lock is released, a booting node may successfully read the relocated data. Thus, a booting node must either complete reading configuration data before relocation can begin, or a booting node must wait until the relocation has finished and all copies of the data and metadata are consistent before starting to read the configuration data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
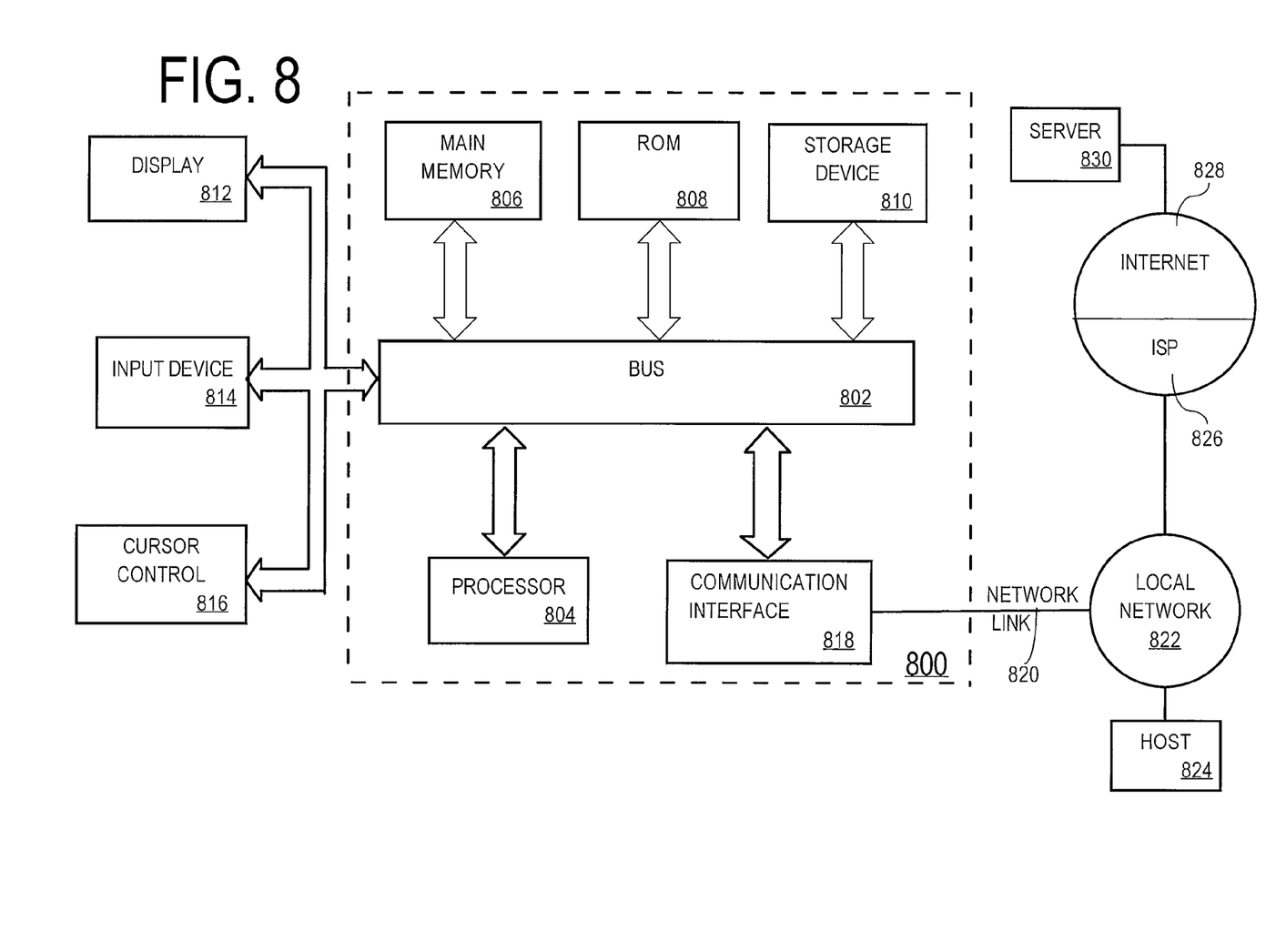
FIG. 8 is a block diagram that depicts a computer system upon which an embodiment of the invention may be implemented, according to an embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   a first node, in a clustered multi-node storage system that manages storage data on a plurality of multiple shared storage devices, broadcasting, to a plurality of nodes in said clustered multi-node storage system, a request for other running nodes in said clustered multi-node storage system to send information about configuration data to said first node, said information about said configuration data including a location of said configuration data;
   in response to not receiving a response to the broadcasting of the request, said first node in said clustered multi-node storage system performing bootstrapping operations based on said configuration data;
   wherein performing bootstrapping operations further comprises:
      said first node directly accessing a first shared storage device of said plurality of multiple shared storage devices to retrieve a first version of said configuration data that is stored on said first shared storage device of said plurality of multiple shared storage devices, said first version of said configuration data being stored at a non-fixed location on said first shared storage device of said plurality of multiple shared storage devices;
      said first node directly accessing said plurality of multiple shared storage devices to retrieve a second version of said configuration data that is stored on a second shared storage device of said plurality of multiple shared storage devices, said second version of said configuration data being stored at a non-fixed location on said second shared storage device of said plurality of multiple shared storage devices;
      wherein said first node directly accesses said plurality of multiple shared storage devices to retrieve versions of said configuration data by not using any other node of said multi-node clustered storage system to access said plurality of multiple shared storage devices to retrieve said versions of said configuration data;
      said first node analyzing said first version of said configuration data retrieved from said plurality of multiple shared storage devices and determining that said first version is not a correct version;
      said first node analyzing said second version of said configuration data retrieved from said plurality of multiple shared storage devices and determining that said second version is a correct version; and
      in response to determining that said second version is a correct version, configuring said multi-node clustered storage system based on contents of said second version.

2. The method of claim 1, further comprising:
   causing, after said first node starts performing said bootstrapping operations, a second node to update contents of a version of said configuration data that is stored on said plurality of multiple shared storage devices.

3. The method of claim 1, wherein a shared storage device of said plurality of multiple shared storage devices that is storing said correct version of said configuration data fails.

4. The method of claim 1, wherein said first node cannot communicate with other nodes in said clustered multi-node storage system due to a network failure.

5. A non-transitory computer-readable storage medium storing one or more instructions which, when executed by one or more processors, cause:
   a first node, in a clustered multi-node storage system that manages storage data on a plurality of multiple shared storage devices, broadcasting, to a plurality of nodes in said clustered multi-node storage system, a request for other running nodes in said clustered multi-node storage system to send information about configuration data to said first node, said information about said configuration data including a location of said configuration data;

in response to not receiving a response to the broadcasting of the request, said first node in said clustered multi-node storage system performing bootstrapping operations based on said configuration data;

wherein performing bootstrapping operations further comprises:

said first node directly accessing a first shared storage device of said plurality of multiple shared storage devices to retrieve a first version of said configuration data that is stored on said first shared storage device of said plurality of multiple shared storage devices, said first version of said configuration data being stored at a non-fixed location on said first shared storage device of said plurality of multiple shared storage devices;

said first node directly accessing said plurality of multiple shared storage devices to retrieve a second version of said configuration data that is stored on a second shared storage device of said plurality of multiple shared storage devices, said second version of said configuration data being stored at a non-fixed location on said second shared storage device of said plurality of multiple shared storage devices;

wherein said first node directly accesses said plurality of multiple shared storage devices to retrieve versions of said configuration data by not using any other node of said multi-node clustered storage system to access said plurality of multiple shared storage devices to retrieve said versions of said configuration data;

said first node analyzing said first version of said configuration data retrieved from said plurality of multiple shared storage devices and determining that said first version is not a correct version;

said first node analyzing said second version of said configuration data retrieved from said plurality of multiple shared storage devices and determining that said second version is a correct version; and in response to determining that said second version is a correct version, configuring said multi-node clustered storage system based on contents of said second version.

6. The non-transitory computer-readable storage medium of claim 5, further comprising instructions which, when executed by said one or more processors, causing, after said first node starts performing said bootstrapping operations, a second node to update contents of a version of said configuration data that is stored on said plurality of multiple shared storage devices.

7. The non-transitory computer-readable storage medium of claim 5, wherein a shared storage device of said plurality of multiple shared storage devices that is storing said correct version of said configuration data fails.

8. The non-transitory computer-readable storage medium of claim 5, wherein said first node cannot communicate with other nodes in said clustered multi-node storage system due to a network failure.

* * * * *

UNITED STATES PATENT AND TRADEMARK OFFICE
CERTIFICATE OF CORRECTION

PATENT NO. : 10,127,054 B2
APPLICATION NO. : 14/618232
DATED : November 13, 2018
INVENTOR(S) : Wickremesinghe et al.

Page 1 of 1

It is certified that error appears in the above-identified patent and that said Letters Patent is hereby corrected as shown below:

In the Specification

In Column 7, Line 52, delete "/dev/raw/raw 1," and insert -- /dev/raw/raw1, --, therefor.

Signed and Sealed this
Twenty-ninth Day of October, 2019

Andrei Iancu
*Director of the United States Patent and Trademark Office*